(12) United States Patent
Chan (10) Patent No.: US 11,454,755 B1
(45) Date of Patent: Sep. 27, 2022

(54) LIGHT EMITTING STRUCTURE (71) Applicant: Primax Electronics Ltd., Taipei (TW)

(72) Inventor: Wei-Ping Chan, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/483,766

(22) Filed: Sep. 23, 2021

(30) Foreign Application Priority Data

Aug. 2, 2021 (TW) .................................. 110128431

(51) Int. Cl.
*F21S 43/236* (2018.01)
*F21V 8/00* (2006.01)
*F21V 5/04* (2006.01)

(52) U.S. Cl.
CPC ............ *G02B 6/0045* (2013.01); *F21V 5/045* (2013.01); *G02B 6/0051* (2013.01); *G02B 6/0068* (2013.01); *G02B 6/0078* (2013.01); *F21V 2200/20* (2015.01)

(58) Field of Classification Search
CPC ..................................................... F21S 43/236
See application file for complete search history.

(56) References Cited

U.S. PATENT DOCUMENTS

2006/0171137 A1* 8/2006 Tamaki .................. G01D 11/28
362/23.15

* cited by examiner

*Primary Examiner* — Julie A Bannan
(74) *Attorney, Agent, or Firm* — Kirton McConkie; Evan R. Witt (57) ABSTRACT

A light emitting structure includes a light guide ring and a plurality of light emitting elements. The light guide ring has a plurality of light guide portions connected in sequence, and each of the light guide portions includes a light source receiving end and a connecting portion opposite to each other, in which one of the light guide portions is connected to another of the light guide portions, and an inner side or an outer side of the one of the light guide portions is connected to the connecting portion of the other of the light guide portions. The light emitting elements are laterally adjacent to the light source receiving ends of the light guide portions, respectively.

15 Claims, 5 Drawing Sheets

LIGHT EMITTING STRUCTURE

FIELD OF THE INVENTION

The present invention relates to a light emitting structure, and particularly relates to a ring-shaped light emitting structure.

BACKGROUND OF THE INVENTION

Among the existing ring-shaped light emitting designs, a ring-shaped optical fiber is mainly used, or light emitting elements matched with a ring-shaped lens are used. However, the ring-shaped optical fiber can only emit light in a single region, and a dark region will be formed at a junction of the ring-shaped optical fiber. In addition, the price of the ring-shaped optical fiber is quite expensive. As for the light emitting elements matched with the ring-shaped lens, since the light emitting elements are disposed beneath the ring-shaped lens, those occupy a large space. If a distance between the light emitting elements and the ring-shaped lens is reduced in order to reduce the occupied space, it may cause uneven brightness. Accordingly, there is a need in the art for an improved ring-shaped light emitting structure to solve the above technical issues.

SUMMARY OF THE INVENTION

The present disclosure provides a light emitting structure, which includes a light guide ring and a plurality of light emitting elements. The light guide ring has a plurality of light guide portions connected in sequence, and each of the light guide portions includes a light source receiving end and a connecting portion opposite to each other, in which one of the light guide portions is connected to another of the light guide portions, and an inner side or an outer side of the one of the light guide portions is connected to the connecting portion of the other of the light guide portions. The light emitting elements are laterally adjacent to the light source receiving ends of the light guide portions, respectively.

In some embodiments of the present invention, a width of the light source receiving end of each of the light guide portions is greater than a width of the connecting portion of each of the light guide portions.

In some embodiments of the present invention, the light source receiving end of the one of the light guide portions is adjacent to and separated from the connecting portion of the other of the light guide portions.

In some embodiments of the present invention, each of the light guide portions further includes a tail portion, and the light source receiving end and the tail portion are opposite to each other, and the tail portion is adjacent to the connecting portion.

In some embodiments of the present invention, the inner side of the one of the light guide portions is connected to the connecting portion of the other of the light guide portions, and the connecting portion of the other of the light guide portions is between the one of the light guide portions and the tail portion of the other of the light guide portions.

In some embodiments of the present invention, the light guide ring defines an inner region and an outer region, and the light emitting elements are disposed in the outer region.

In some embodiments of the present invention, the light emitting structure further includes a diffuser plate disposed beneath the light guide ring, and a portion of a vertical projection region of the diffuser plate is located in the inner region.

In some embodiments of the present invention, a vertical projection region of the light guide ring is located within the vertical projection region of the diffuser plate.

In some embodiments of the present invention, a vertical projection region of each of the light emitting elements is located within the vertical projection region of the diffuser plate.

In some embodiments of the present invention, the diffuser plate has a protruding portion disposed in the inner region, and the protruding portion is ring-shaped, and a side surface of the protruding portion faces an inner side surface of the light guide ring.

In some embodiments of the present invention, an upper surface of the protruding portion of the diffuser plate is substantially coplanar with an upper surface of the light guide ring.

In some embodiments of the present invention, the outer side of the one of the light guide portions is connected to the connecting portion of the other of the light guide portions, and the connecting portion of the other of the light guide portions is between the one of the light guide portions and the tail portion of the other of the light guide portions.

In some embodiments of the present invention, the light guide ring defines an inner region and an outer region, and the light emitting elements are disposed in the inner region.

In some embodiments of the present invention, the light emitting structure further includes a diffuser plate disposed beneath the light guide ring, and a portion of a vertical projection region of the diffuser plate is located in the outer region.

In some embodiments of the present invention, a vertical projection region of the light guide ring partially overlaps with the vertical projection region of the diffuser plate.

In some embodiments of the present invention, the diffuser plate has a protruding portion disposed in the outer region, and the protruding portion is ring-shaped, and a side surface of the protruding portion faces an outer side surface of the light guide ring.

In some embodiments of the present invention, an upper surface of the protruding portion of the diffuser plate is substantially coplanar with an upper surface of the light guide ring.

Since the light guide ring of the light emitting structure of the present invention has a plurality of light guide portions connected in sequence, and the light guide portions are respectively matched with a plurality of light emitting elements, those can exhibit a multi-zone light emitting effect. In addition, the light emitting elements of the light emitting structure of the present invention are laterally adjacent to the light guide portions, respectively, so the light emitting structure has uniform brightness and small space occupation, so that a light emitting module or a light emitting device having the light emitting structure has the advantage of being thinner. Accordingly, the light emitting structure of the present invention can solve the technical issues described in the related art.

DETAIL DESCRIPTION OF THE PREFERRED EMBODIMENT

The advantages and features of the present invention and the method for achieving the same will be described in more detail with reference to exemplary embodiments and the accompanying drawings to make it easier to understand. However, the present invention can be implemented in different forms and should not be construed as being limited to the embodiments set forth herein. On the contrary, for those skilled in the art, the provided embodiments will make this disclosure more thorough, comprehensive and complete to convey the scope of the present invention.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180 degrees, the relationship between the one element and the other element may change from "beneath" to "over." In addition, the spatially relative descriptions used herein should be interpreted the same.

As described in the related art, both the existing ring-shaped optical fiber and the light emitting elements matched with the ring-shaped lens have disadvantages. Specifically, the ring-shaped optical fiber can only emit light in the single region, and the dark region will be formed at the junction of the ring-shaped optical fiber. In addition, the price of the ring-shaped optical fiber is quite expensive. As for the light emitting elements matched with the ring-shaped lens, those occupy the large space. If the distance between the light emitting elements and the ring-shaped lens is reduced in order to reduce the occupied space, it may cause uneven brightness. Accordingly, the present invention provides an improved light emitting structure to solve the above technical issues. Various embodiments of the light emitting structure of the present invention will be described in detail below.

Figure 1:
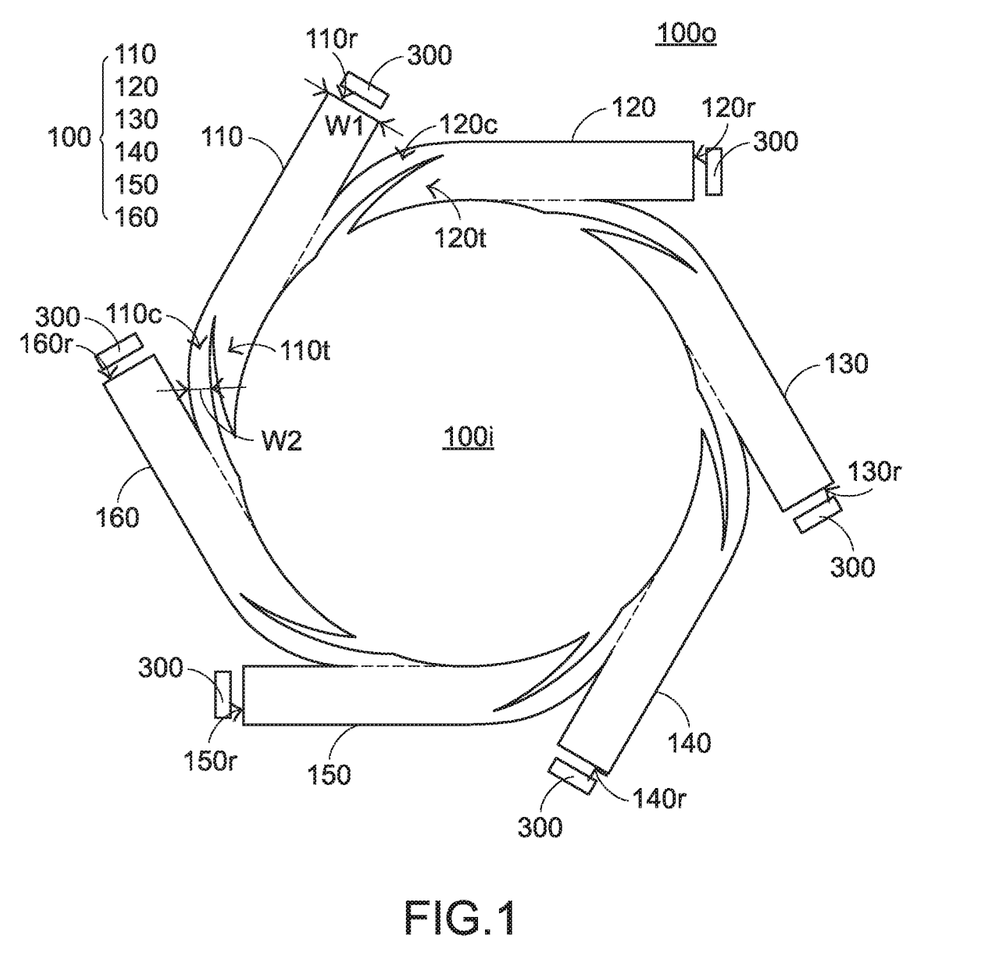
FIG. 1 is a schematic top view of a light emitting structure according to an embodiment of the present invention.

FIG. 1 is a schematic top view of a light emitting structure according to an embodiment of the present invention. As shown in FIG. 1, the light emitting structure includes a light guide ring 100 and a plurality of light emitting elements 300. In this embodiment, the light guide ring 100 is circular ring-shaped, but not limited thereto. The light guide ring 100 may have another closed shape, such as polygonal ring-shaped (e.g., rectangular ring-shaped) or elliptical ring-shaped.

The light guide ring 100 has a plurality of light guide portions 110, 120, 130, 140, 150 and 160 connected in sequence, and each of the light guide portions includes a light source receiving end and a connecting portion. Taking the light guide portion 110 as an example, the light guide portion 110 includes a light source receiving end 110r and a connecting portion 110c opposite to each other. Taking the light guide portion 120 as an example, the light guide portion 120 includes a light source receiving end 120r and a connecting portion 120c opposite to each other.

One of the light guide portions is connected to another of the light guide portions, and an inner side of the one of the light guide portions is connected to the connecting portion of the other of the light guide portions. Taking the light guide portion 110 and the light guide portion 120 as an example, the light guide portion 110 and the light guide portion 120 are connected to each other, and an inner side of the light guide portion 110 is connected to the connecting portion 120c of the light guide portion 120. Taking the light guide portion 160 and the light guide portion 110 as an example, the light guide portion 160 and the light guide portion 110 are connected to each other, and an inner side of the light guide portion 160 is connected to the connecting portion 110c of the light guide portion 110.

In some embodiments, the light guide portions 110, 120, 130, 140, 150 and 160 are integrally formed, but not limited thereto. The light guide portions 110, 120, 130, 140, 150 and 160 may be six portions, and the six portions are assembled to form the light guide ring 100.

As shown in FIG. 1, the light emitting elements 300 are laterally adjacent to the light source receiving ends 110r, 120r, 130r, 140r, 150r, and 160r of the light guide portions 110, 120, 130, 140, 150, and 160, respectively. The number of light emitting elements 300 can be determined according to the number of light guide portions, so that brightness uniformity of a light emitting surface can be quite good. In addition, the light emitting elements can be disposed over a circuit board (not shown), for example, can be disposed over a flexible circuit board. In some embodiments, the flexible circuit board can be bent into a ring shape, so that the light emitting elements exhibit a ring-shaped arrangement shown in FIG. 1, which can improve utilization of the circuit board and thus to reduce material costs.

In some embodiments, a width of the light source receiving end of each of the light guide portions is greater than a width of the connecting portion of each of the light guide portions. Taking the light guide portion 110 as an example, a width W1 of the light source receiving end 110r of the light guide portion 110 is greater than a width W2 of the connecting portion 110c of the light guide portion 110.

In some embodiments, the light source receiving end of the one of the light guide portions is adjacent to and separated from the connecting portion of the other of the light guide portions. Taking the light guide portion 110 and the light guide portion 120 as an example, the light source receiving end 110r of the light guide portion 110 and the connecting portion 120c of the light guide portion 120 are laterally adjacent to and separated from each other, and the light source receiving end 110r of the light guide portion 110 is not in contact with the connecting portion 120c of the light guide portion 120.

In some embodiments, each of the light guide portions further includes a tail portion, and the light source receiving end and the tail portion are opposite to each other, and the tail portion is adjacent to the connecting portion. Taking the light guide portion 110 as an example, the light guide portion 110 has a tail portion 110t, and the light source receiving end 110r and the tail portion 110t are opposite to each other, and the tail portion 110t is laterally adjacent to the connecting portion 110c, and an end of the tail portion 110t and the connecting portion 110c are separated from each other. Taking the light guide portion 120 as an example, the light guide portion 120 has a tail portion 120t, and the light source receiving end 120r and the tail portion 120t are opposite to each other, and the tail portion 120t is laterally adjacent to the connecting portion 120c, and an end of the tail portion 120t and the connecting portion 120c are separated from each other. The tail portion is configured to block light. For example, if the light guide portion 110 conducts yellow light, and the light guide portion 120 conducts white light, the tail portion 120t of the light guide portion 120 can prevent too much white light from being conducted into the light guide portion 110.

In some embodiments, the connecting portion of the other of the light guide portions is between the one of the light guide portions and the tail portion of the other of the light guide portions. Taking the light guide portion 110 and the light guide portion 120 as an example, the connecting portion 120c of the light guide portion 120 is arranged between the light guide portion 110 and the tail portion 120t of the light guide portion 120.

In some embodiments, the light guide ring 100 defines an inner region 100i and an outer region 100o, and the light emitting elements 300 are disposed in the outer region 100o. The inner region 100i is surrounded by the light guide ring 100. The outer region 100o is a region other than a region of the light guide ring 100 and the inner region 100i.

Figure 2:
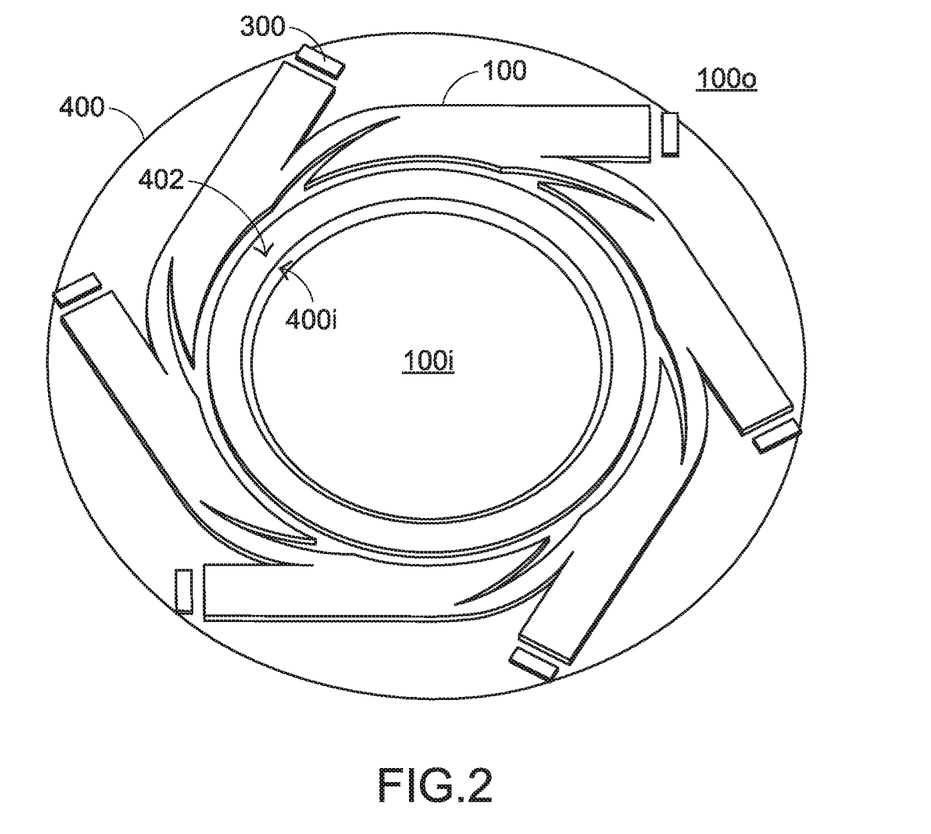
FIG. 2 is a schematic top view of a light emitting structure according to an embodiment of the present invention.

FIG. 2 is a schematic top view of a light emitting structure according to an embodiment of the present invention. The difference between the embodiment of FIG. 2 and that of FIG. 1 is that the light emitting structure of FIG. 2 further includes a diffuser plate 400 disposed beneath the light guide ring 100, and a portion of a vertical projection region of the diffuser plate 400 is located in the inner region 100i.

In some embodiments, as shown in FIG. 2, a vertical projection region of the light guide ring 100 is located within the vertical projection region of the diffuser plate 400. However, the present invention is not limited to the foregoing embodiments, and a location of the diffuser plate and an overlapping area between the diffuser plate and the light guide ring can be appropriately adjusted according to actual requirements. In some embodiments, a vertical projection region of each of the light emitting elements 300 is located within the vertical projection region of the diffuser plate 400.

Figure 3:
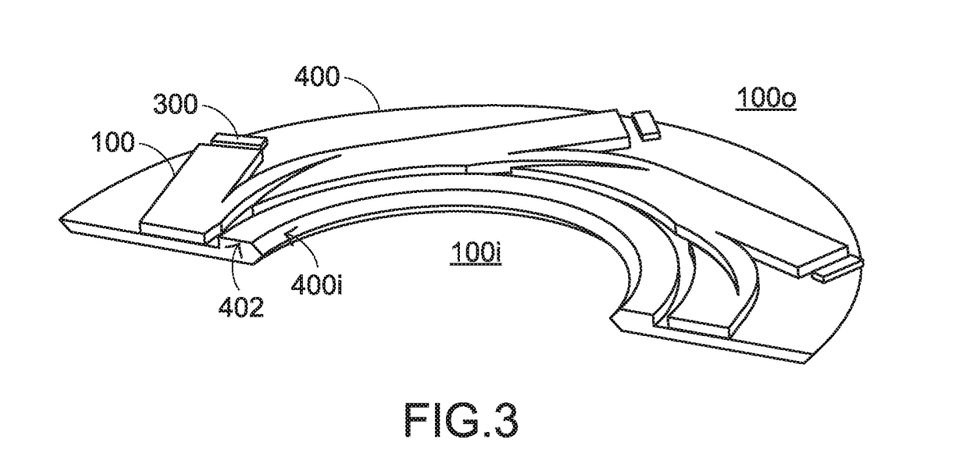
FIG. 3 is a schematic cross-sectional view of the light emitting structure of FIG. 2.

FIG. 3 is a schematic cross-sectional view of the light emitting structure of FIG. 2. As shown in FIGS. 2 and 3, in some embodiments, the diffuser plate 400 has a protruding portion 402 disposed in the inner region 100i, and the protruding portion 402 is ring-shaped, and a side surface of the protruding portion 402 faces an inner side surface of the light guide ring 100. In some embodiments, an upper surface of the protruding portion 402 of the diffuser plate 400 is substantially coplanar with an upper surface of the light guide ring 100.

In some embodiments, an inner side surface 400i of the diffuser plate 400 away from the light emitting elements 300 is a light emitting surface of the light emitting structure. In some embodiments, the light emitting elements 300 respectively corresponding to the light guide portions 110, 120, 130, 140, 150 and 160 have different light emitting colors. As such, the inner side surface 400i of the diffuser plate 400 can present a colored halo.

Figure 4:
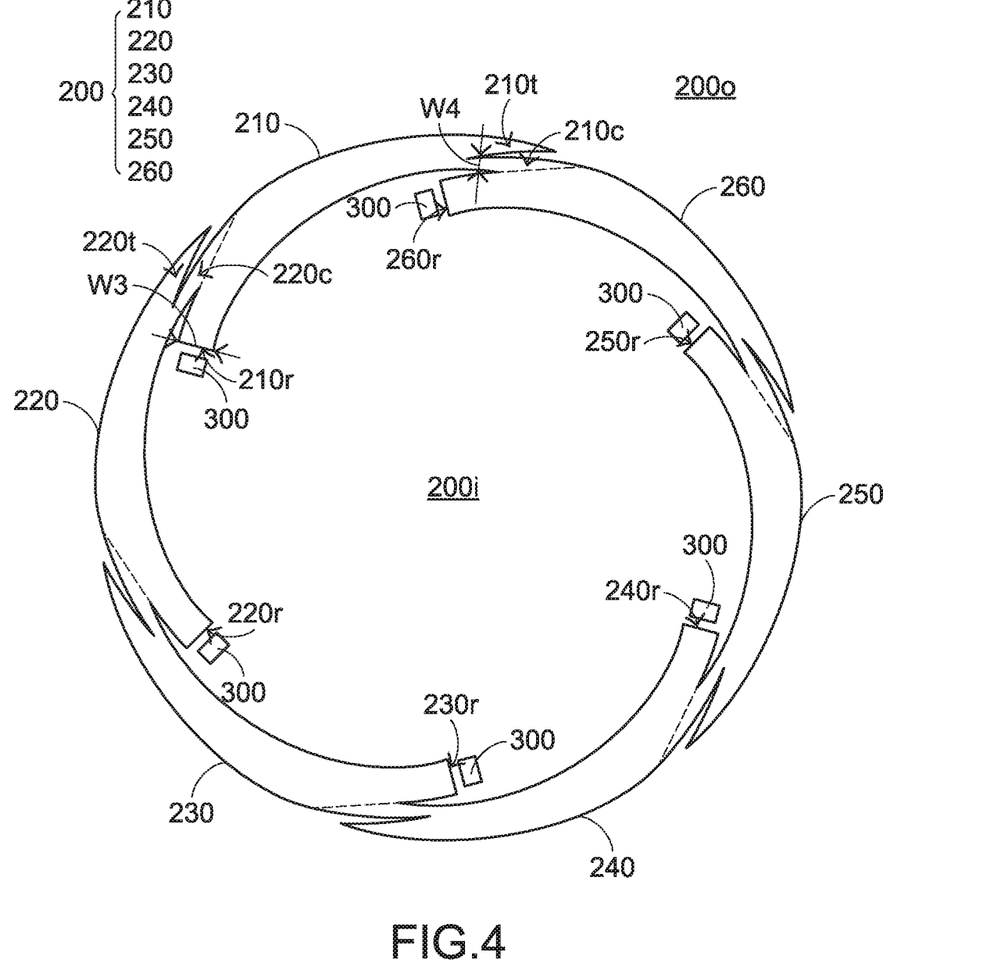
FIG. 4 is a schematic top view of a light emitting structure according to an embodiment of the present invention.

FIG. 4 is a schematic top view of a light emitting structure according to an embodiment of the present invention. As shown in FIG. 4, the light emitting structure includes a light guide ring 200 and a plurality of light emitting elements 300. In this embodiment, the light guide ring 200 is circular ring-shaped, but not limited thereto. The light guide ring 200 may have another closed shape, such as polygonal ring-shaped (e.g., rectangular ring-shaped) or elliptical ring-shaped.

The light guide ring 200 has a plurality of light guide portions 210, 220, 230, 240, 250 and 260 connected in sequence, and each of the light guide portions includes a light source receiving end and a connecting portion. Taking the light guide portion 210 as an example, the light guide portion 210 includes a light source receiving end 210r and a connecting portion 210c opposite to each other. Taking the light guide portion 220 as an example, the light guide portion 220 includes a light source receiving end 220r and a connecting portion 220c opposite to each other.

One of the light guide portions is connected to another of the light guide portions, and an outer side of the one of the light guide portions is connected to the connecting portion of the other of the light guide portions. Taking the light guide portion 210 and the light guide portion 220 as an example, the light guide portion 210 and the light guide portion 220 are connected to each other, and an outer side of the light guide portion 210 is connected to the connecting portion 220c of the light guide portion 220. Taking the light guide portion 260 and the light guide portion 210 as an example, the light guide portion 260 and the light guide portion 210 are connected to each other, and an outer side of the light guide portion 260 is connected to the connecting portion 210c of the light guide portion 210.

In some embodiments, the light guide portions 210, 220, 230, 240, 250 and 260 are integrally formed, but not limited thereto. The light guide portions 210, 220, 230, 240, 250 and 260 may be six portions, and the six portions are assembled to form the light guide ring 200.

As shown in FIG. 4, the light emitting elements 300 are laterally adjacent to the light source receiving ends 210r, 220r, 230r, 240r, 250r and 260r of the light guide portions 210, 220, 230, 240, 250 and 260, respectively.

In some embodiments, a width of the light source receiving end of each of the light guide portions is greater than a width of the connecting portion of each of the light guide portions. Taking the light guide portion 210 as an example, a width W3 of the light source receiving end 210r of the light guide portion 210 is greater than a width W4 of the connecting portion 210c of the light guide portion 210.

In some embodiments, the light source receiving end of the one of the light guide portions is adjacent to and separated from the connecting portion of the other of the light guide portions. Taking the light guide portion 210 and the light guide portion 220 as an example, the light source receiving end 210r of the light guide portion 210 and the connecting portion 220c of the light guide portion 220 are laterally adjacent to and separated from each other, and the light source receiving end 210r of the light guide portion 210 is not in contact with the connecting portion 220c of the light guide portion 220.

In some embodiments, each of the light guide portions further includes a tail portion, and the light source receiving end and the tail portion are opposite to each other, and the tail portion is adjacent to the connecting portion. Taking the light guide portion 210 as an example, the light guide portion 210 has a tail portion 210t, and the light source receiving end 210r and the tail portion 210t are opposite to each other, and the tail portion 210t is laterally adjacent to the connecting portion 210c, and an end of the tail portion 210t and the connecting portion 210c are separated from each other. Taking the light guide portion 220 as an example, the light guide portion 220 has a tail portion 220t, and the light source receiving end 220r and the tail portion 220t are opposite to each other, and the tail portion 220t is laterally adjacent to the connecting portion 220c, and an end of the tail portion 220t and the connecting portion 220c are separated from each other. The tail portion is configured to block light. For example, if the light guide portion 210 conducts green light, and the light guide portion 220 conducts blue light, the tail portion 220t of the light guide portion 220 can prevent too much blue light from being conducted into the light guide portion 210.

In some embodiments, the connecting portion of the other of the light guide portions is between the one of the light guide portions and the tail portion of the other of the light guide portions. Taking the light guide portion 210 and the light guide portion 220 as an example, the connecting portion 220c of the light guide portion 220 is arranged between the light guide portion 210 and the tail portion 220t of the light guide portion 220.

In some embodiments, the light guide ring 200 defines an inner region 200i and an outer region 200o, and the light emitting elements 300 are disposed in the inner region 200i. The inner region 200i is surrounded by a light guide ring 200. The outer region 200o is a region other than a region of the light guide ring 200 and the inner region 200i.

Figure 5:
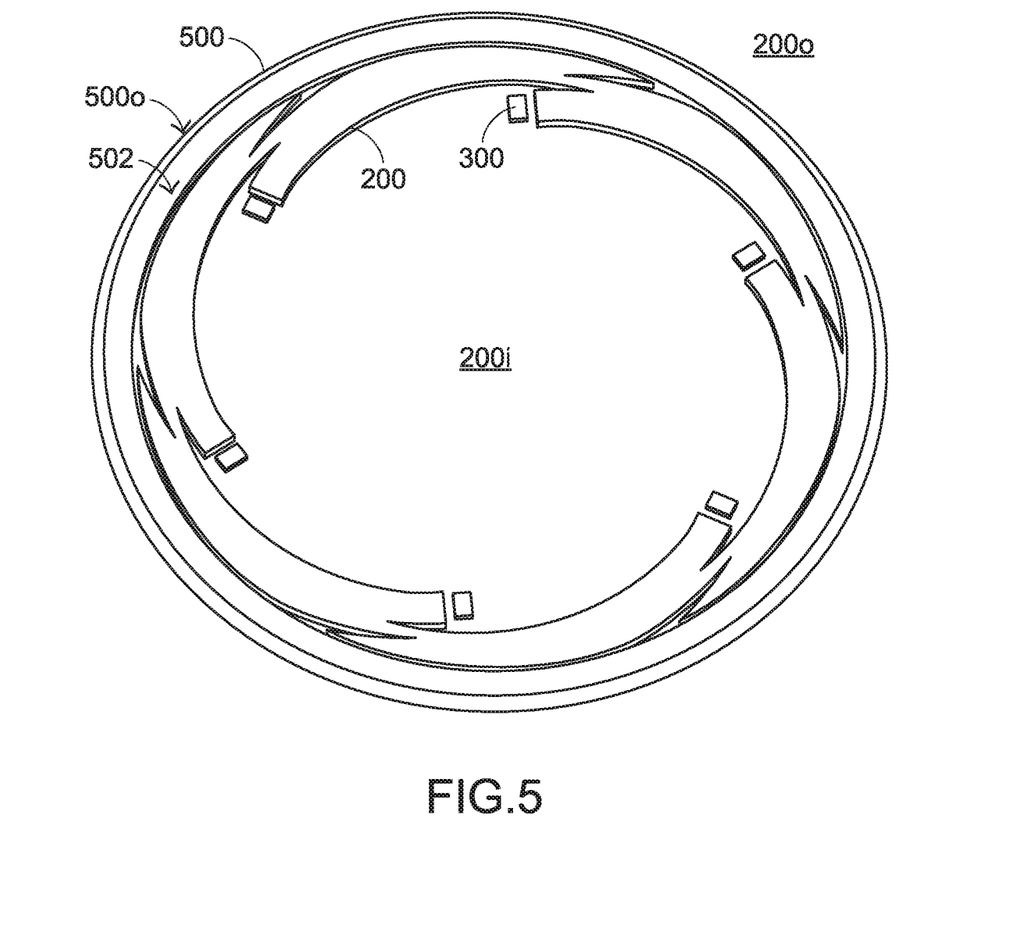
FIG. 5 is a schematic top view of a light emitting structure according to an embodiment of the present invention.

FIG. 5 is a schematic top view of a light emitting structure according to an embodiment of the present invention. The difference between the embodiment of FIG. 5 and that of FIG. 4 is that the light emitting structure of FIG. 5 further includes a diffuser plate 500 disposed beneath the light guide ring 200, and a portion of a vertical projection region of the diffuser plate 500 is located in the outer region 200o.

Figure 6:
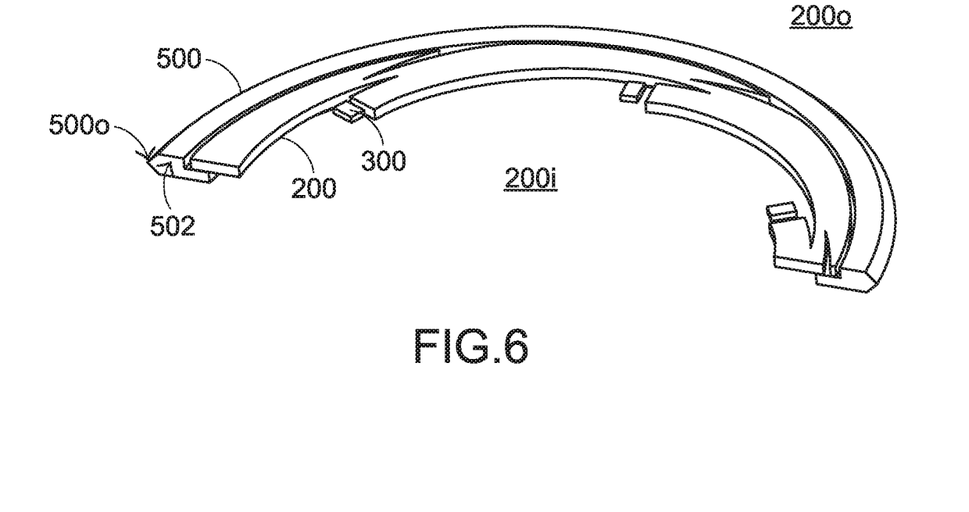
FIG. 6 is a schematic cross-sectional view of the light emitting structure of FIG. 5.

FIG. 6 is a schematic cross-sectional view of the light emitting structure of FIG. 5. As shown in FIGS. 5 and 6, in some embodiments, a vertical projection region of the light guide ring 200 partially overlaps with the vertical projection region of the diffuser plate 500. However, the present invention is not limited to the foregoing embodiments, and a location of the diffuser plate and an overlapping area between the diffuser plate and the light guide ring can be appropriately adjusted according to actual requirements. In some embodiments, a vertical projection region of each of the light emitting elements 300 is not overlapped with the vertical projection region of the diffuser plate 500.

As shown in FIGS. 5 and 6, in some embodiments, the diffuser plate 500 has a protruding portion 502 disposed in the outer region 200o, and the protruding portion 502 is ring-shaped, and a side surface of the protruding portion 502 faces an outer side surface of the light guide ring 200. In some embodiments, an upper surface of the protruding portion 502 of the diffuser plate 500 is substantially coplanar with an upper surface of the light guide ring 200.

In some embodiments, an outer side surface 500o of the diffuser plate 500 away from the light emitting elements 300 is a light emitting surface of the light emitting structure. In some embodiments, the light emitting elements 300 respectively corresponding to the light guide portions 210, 220, 230, 240, 250 and 260 have different light emitting colors. As such, the outer side surface 500o of the diffuser 500 can present a colored halo.

As can be seen from the above, since the light guide ring of the light emitting structure of the present invention has the plurality of light guide portions connected in sequence, and the light guide portions are respectively matched with the plurality of light emitting elements, those can exhibit a multi-zone light emitting effect. In addition, the light emitting elements of the light emitting structure of the present invention are laterally adjacent to the light guide portions, respectively, so the light emitting structure has uniform brightness and small space occupation, so that a light emitting module or a light emitting device having the light emitting structure has the advantage of being thinner.

Figure 7:
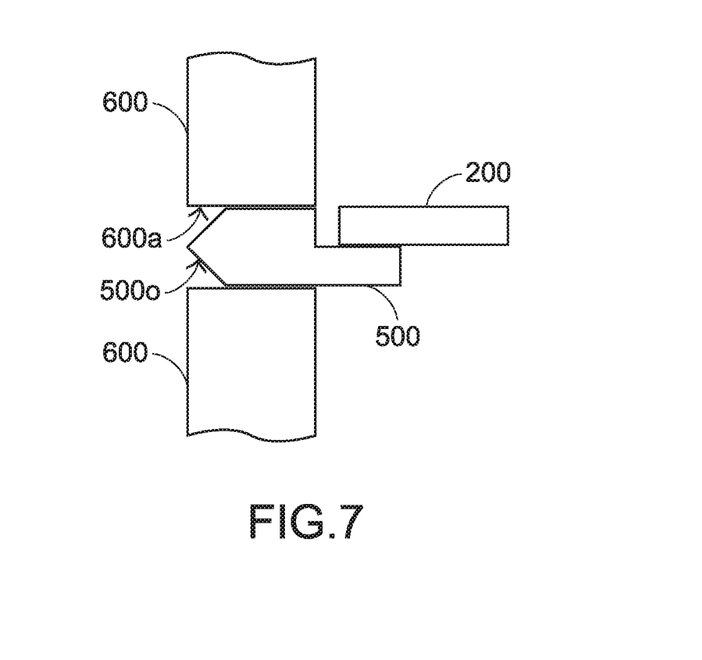
FIG. 7 is a schematic cross-sectional view of a light emitting device according to an embodiment of the present invention.

FIG. 7 is a schematic cross-sectional view of a light emitting device according to an embodiment of the present invention. As shown in FIG. 7, the light emitting device includes a housing 600, a light guide ring and a diffuser plate. The light guide ring and the diffuser plate can be, for example, the light guide ring 200 and the diffuser plate 500 shown in FIG. 5. In some embodiments, the light guide ring 200 and the diffuser plate 500 can be replaced with the light guide ring 100 and the diffuser plate 400 shown in FIG. 2. However, the combination of the light guide ring and the diffuser plate of the present invention is not limited to the embodiment of FIG. 2 and FIG. 3 and the embodiment of FIG. 5 and FIG. 6. The combination of the light guide ring and the diffuser plate can be adjusted and designed appropriately according to a light emitting position required by the light emitting device.

The housing 600 has an opening 600a exposing the light emitting surface of the diffuser plate. As shown in FIG. 7, the opening 600a exposes the outer side surface 500o of the diffuser plate 500. If the light emitting elements respectively corresponding to the light guide portions of the light guide ring 200 have different light emitting colors, the outer side surface 500o can present a colored halo.

In some embodiments, the light emitting device further includes a reflective material (not shown), which may be disposed over the light guide ring and/or on a side surface of the light guide ring (e.g., an inner side surface of the light guide ring 200), so that the light leaving the light guide ring can be reflected back into the light guide ring and thus to improve light utilization. The reflective material can be, for example, ink or a plastic material, such as polyethylene terephthalate (PET), acrylonitrile butadiene styrene (ABS) resin, polycarbonate (PC), or another suitable material. The light emitting device having the light emitting structure of the present invention may be, for example, gaming-related products (e.g., a fan or VGA), a doorbell code lock application, or another product that requires ring-shaped light emitting.

However, the above are only the preferred embodiments of the present invention, and should not be used to limit the scope of implementation of the present invention, that is, simple equivalent changes and modifications made in accordance with claims and description of the present invention are still within the scope of the present invention. In addition, any embodiment of the present invention or claim does not need to achieve all the objectives or advantages disclosed in the present invention. In addition, the abstract and the title are not used to limit the scope of claims of the present invention.

What is claimed is:

1. A light emitting structure, comprising:
    a light guide ring having a plurality of light guide portions connected in sequence, and each of the light guide portions comprising a light source receiving end and a connecting portion opposite to each other, wherein one of the light guide portions is connected to another of the light guide portions, and an inner side or an outer side of the one of the light guide portions is connected to the connecting portion of the other of the light guide portions, wherein each of the light guide portions further comprises a tail portion, and the light source receiving end and the tail portion are opposite to each other, and the tail portion is adjacent to the connecting portion, wherein the inner side of the one of the light guide portions is connected to the connecting portion of the other of the light guide portions, and the connecting portion of the other of the light guide portions is between the one of the light guide portions and the tail portion of the other of the light guide portions; and a plurality of light emitting elements laterally adjacent to the light source receiving ends of the light guide portions, respectively.

2. The light emitting structure of claim 1, wherein a width of the light source receiving end of each of the light guide portions is greater than a width of the connecting portion of each of the light guide portions.

3. The light emitting structure of claim 1, wherein the light source receiving end of the one of the light guide portions is adjacent to and separated from the connecting portion of the other of the light guide portions.

4. The light emitting structure of claim 1, wherein the light guide ring defines an inner region and an outer region, and the light emitting elements are disposed in the outer region.

5. The light emitting structure of claim 4, further comprising:
a diffuser plate disposed beneath the light guide ring, and a portion of a vertical projection region of the diffuser plate is located in the inner region.

6. The light emitting structure of claim 5, wherein a vertical projection region of the light guide ring is located within the vertical projection region of the diffuser plate.

7. The light emitting structure of claim 5, wherein a vertical projection region of each of the light emitting elements is located within the vertical projection region of the diffuser plate.

8. The light emitting structure of claim 5, wherein the diffuser plate has a protruding portion disposed in the inner region, and the protruding portion is ring-shaped, and a side surface of the protruding portion faces an inner side surface of the light guide ring.

9. The light emitting structure of claim 8, wherein an upper surface of the protruding portion of the diffuser plate is substantially coplanar with an upper surface of the light guide ring.

10. A light emitting structure comprising:
a light guide ring having a plurality of light guide portions connected in sequence, and each of the light guide portions comprising a light source receiving end and a connecting portion opposite to each other, wherein one of the light guide portion is connected to another of the light guide portions, and an inner side or an outer side of the one of the light guide portions is connected to the connecting portion of the other of the light guide portions, wherein each of the light guide portions further comprises a tail portion, and the light source receiving end and the tail portion are opposite to each other, and the tail portion is adjacent to the connecting portion, wherein the outer side of the one of the light guide portions is connected to the connecting portion of the other of the light guide portions, and the connecting portion of the other of the light guide portions is between the one of the light guide portions and the tail portion of the other of the light guide portions.

11. The light emitting structure of claim 10, wherein the light guide ring defines an inner region and an outer region, and the light emitting elements are disposed in the inner region.

12. The light emitting structure of claim 11, further comprising:
a diffuser plate disposed beneath the light guide ring, and a portion of a vertical projection region of the diffuser plate is located in the outer region.

13. The light emitting structure of claim 12, wherein a vertical projection region of the light guide ring partially overlaps with the vertical projection region of the diffuser plate.

14. The light emitting structure of claim 12, wherein the diffuser plate has a protruding portion disposed in the outer region, and the protruding portion is ring-shaped, and a side surface of the protruding portion faces an outer side surface of the light guide ring.

15. The light emitting structure of claim 14, wherein an upper surface of the protruding portion of the diffuser plate is substantially coplanar with an upper surface of the light guide ring.

* * * * *